(12) United States Patent
Sube

(10) Patent No.: US 6,750,907 B1
(45) Date of Patent: Jun. 15, 2004

(54) IMAGING APPARATUS WITH LOW-ILLUMINANCE IMAGING CAPABILITY

(75) Inventor: Makoto Sube, Yokohama (JP)

(73) Assignee: Matsushita Electric Industrial Co., Ltd. (JP)

( * ) Notice: Subject to any disclaimer, the term of this patent is extended or adjusted under 35 U.S.C. 154(b) by 0 days.

(21) Appl. No.: 09/497,127

(22) Filed: Feb. 3, 2000

(30) Foreign Application Priority Data

Feb. 4, 1999 (JP) ............................................. 11-027475

(51) Int. Cl.$^7$ .......................... H04N 5/235; H04N 5/225
(52) U.S. Cl. ................................ 348/229.1; 348/217.1; 348/235
(58) Field of Search .......................... 348/216.1, 217.1, 348/229.1, 230.1, 241, 246, 678, 252, 607, 625; 382/270, 272

(56) References Cited

U.S. PATENT DOCUMENTS

| | | | | |
|---|---|---|---|---|
| 4,454,541 A | * | 6/1984 | Duschl | 348/125 |
| 4,473,845 A | * | 9/1984 | Davy | 348/616 |
| 5,398,079 A | * | 3/1995 | Liu et al. | 348/699 |
| 5,978,047 A | * | 11/1999 | May | 348/616 |
| 6,040,860 A | * | 3/2000 | Tamura et al. | 348/252 |

FOREIGN PATENT DOCUMENTS

JP 5-48961 2/1993

* cited by examiner

*Primary Examiner*—Ngoc-Yen Vu
*Assistant Examiner*—Timothy J. Henn
(74) *Attorney, Agent, or Firm*—Connolly, Bove, Lodge & Hutz LLP

(57) ABSTRACT

Low illuminance shooting is achieved by raising the gain or sensitivity through noise reduction while mitigating the deterioration in resolution. An image signal that has been imaged by CCD and amplified CDS is converted into a series of digital pixel values. A weighted moving average of a current pixel value and pixel values of at least two pixels spatially adjacent to the pixel of the current pixel value are calculated. The weighted moving average is divided by a division factor smaller than the sum of weights used in the weighted moving average calculation. If the image signal is smaller than a predetermined value, a selector supplies the divided weighted moving average as the current pixel value to the next stage. This enables not only a gain increase due to noise reduction but also a mitigation of the deterioration in resolution.

9 Claims, 7 Drawing Sheets

IMAGING APPARATUS WITH LOW-ILLUMINANCE IMAGING CAPABILITY

BACKGROUND OF THE INVENTION

1. Field of the Invention

The invention relates to an imaging apparatus having a low-illuminance imaging function.

2. Description of the Prior Art

Various imaging apparatuses have been proposed so far that enable shooting a subject of low illuminance.

One of such apparatus is disclosed as "IMAGE PICKUP DEVICE CAPABLE OF IMAGE PICKUP UNDER LOW ILLUMINANCE" in Japanese patent application publication No. 05048961 (1993). FIG. 1 shows the arrangement of the image pickup device. In FIG. 1, if a low illuminance detector 90 detects a low illuminance, the gain-up controller 91 responsively increases the gains of a variable gain amplifier 92 and an AGC (automatic gain control) 93. The controller 91 further causes the signal synthesizer 94 to synthesize two time-adjacent signals or two horizontally adjacent signals for noise mitigation. Since the adjacent signal synthesis results in a noise reduction, this enables gain-controllable circuits to achieve a higher gain-up than usual.

However, synthesizing two time-adjacent signals also causes a problem of deteriorating the horizontal resolution.

SUMMARY OF THE INVENTION

The above problem is overcome by an imaging apparatus that enables low illuminance shooting by raising the gain or sensitivity through noise reduction while mitigating the deterioration in resolution in accordance with the principles of the invention.

An image signal having been imaged and amplified is converted into a series of digital pixel values. A weighted moving average of a current pixel value and pixel values of at least two pixels spatially adjacent to the pixel of the current pixel value are calculated. The weighted moving average is divided by a division factor smaller than the sum of weights used in the weighted moving average calculation. If the image signal is smaller than a predetermined value, a selector supplies the divided weighted moving average as the current pixel value to the next stage. This enables not only a gain increase due to noise reduction but also a mitigation of the deterioration in resolution The weight of the current pixel value is preferably set substantially equal to half of the sum of the weights.

In one embodiment, the weighted moving average is calculated for the current pixel value and the pixel values of two pixels horizontally adjacent to the current pixel.

In another embodiment, the weighted moving average is calculated for the current pixel value and the pixel values of two pixels vertically adjacent to the current pixel.

In further embodiment, the weighted moving average is calculated for the current pixel value and the pixel values of four pixels horizontally and vertically adjacent to the current pixel.

In still another embodiment, the weighted moving average is calculated for the current pixel value and the pixel values of two pixels horizontally or vertically adjacent to the current. Using the divided weighted moving averages from the selector as a series of digital pixel values, the next stage first finds a second weighted moving average of the current pixel value and pixel values of two pixels linearly adjacent to the pixel of the current pixel value. In this case, the direction of the adjacent pixels is perpendicular to the adjacent pixels used in the weighted moving average calculation in the preceding stage. The second weighted moving average is divided by a division factor smaller than the sum of weights used in finding the second weighted moving average. If the image signal is smaller than a predetermined value, a second selector supplies the divided second weighted moving average as the current pixel value to the next stage.

BRIEF DESCRIPTION OF THE DRAWING

The features and advantages of the present invention will be apparent from the following description of an exemplary embodiment of the invention and the accompanying drawings, in which:

FIG. 7 is a diagram illustrating how the relevant pixels are weighted in the signal synthesizer of FIG. 6;

FIG. 9 is a diagram illustrating how the relevant pixels are weighted in the signal synthesizer of FIG. 8.

Throughout the drawing, the same elements when shown in more than one figure are designated by the same reference numerals.

DETAILED DESCRIPTION OF THE PREFERRED EMBODIMENTS

The invention is applicable to any imaging apparatus using a solid state imaging device. Such imaging apparatuses include electronic still cameras, video cameras, etc.

Figure 2:
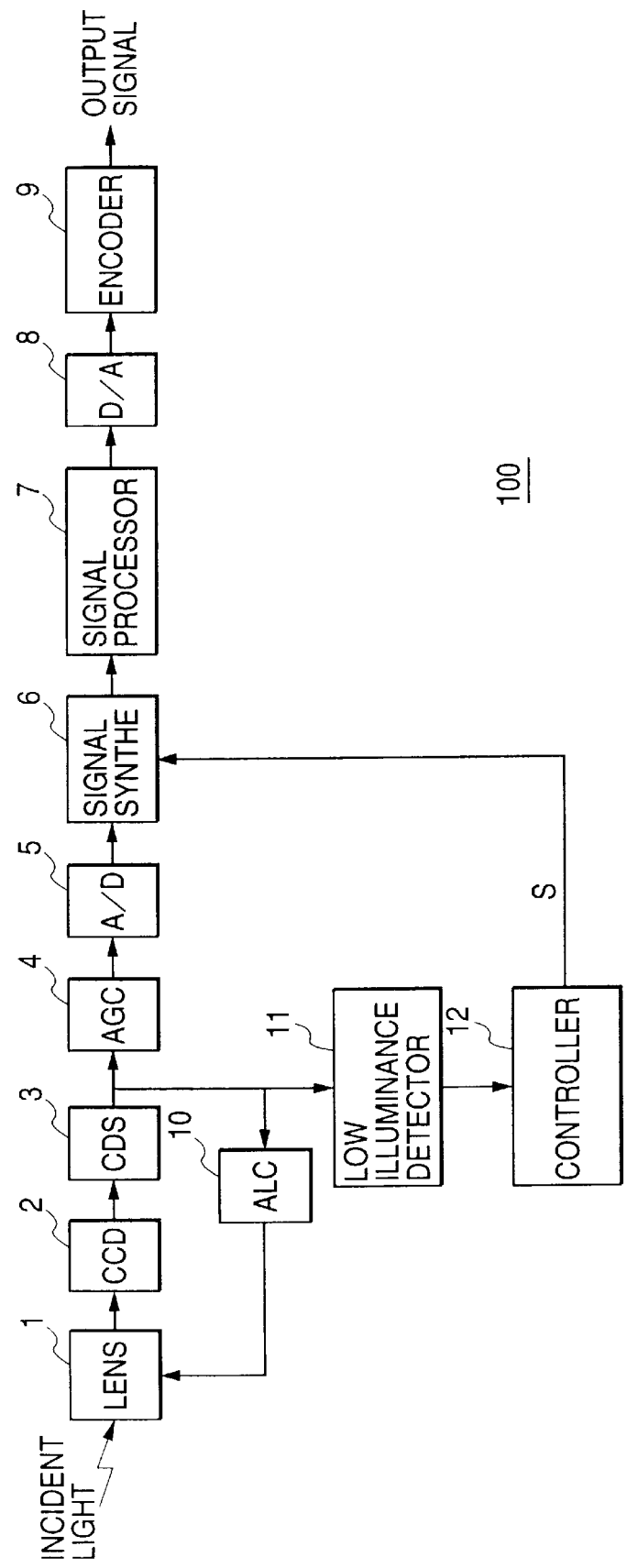
FIG. 2 is a schematic block diagram showing an exemplary arrangement of an imaging apparatus capable of low-illuminance imaging in accordance with an illustrative embodiment of the invention.

FIG. 2 is a schematic block diagram showing an exemplary arrangement of a video camera capable of low-illuminance imaging in accordance with an illustrative embodiment of the invention. In FIG. 2, the video camera 100 includes a lens portion 1. The video camera 100 also includes a CCD (charge coupled device) 2 for receiving light from the lens portion 1, a CDS (correlated double sampling circuit) 3, an AGC (automatic gain control circuit ) 4, an analog-to-digital converter (A/D) 5, a signal synthesizer 6 for synthesizing at least three adjacent pixel values according to the principles of the invention, a signal processor 7, a digital-to-analog converter (D/A) 8 and an encoder (e.g., an NTSC encoder) 9, all of which are serially connected.

The video camera 100 further includes an ALC (automatic level control) 10 having its input connected to the connection node between CDS 3 and AGC 4 to control the lens 1, a low illuminance detector 11 having its input connected to the connection node among CDS 3, AGC 4 and ALC 10, and a controller 6 for controlling the signal synthesizer 6 in response to the signal from the low illuminance detector 11.

Figure 3:
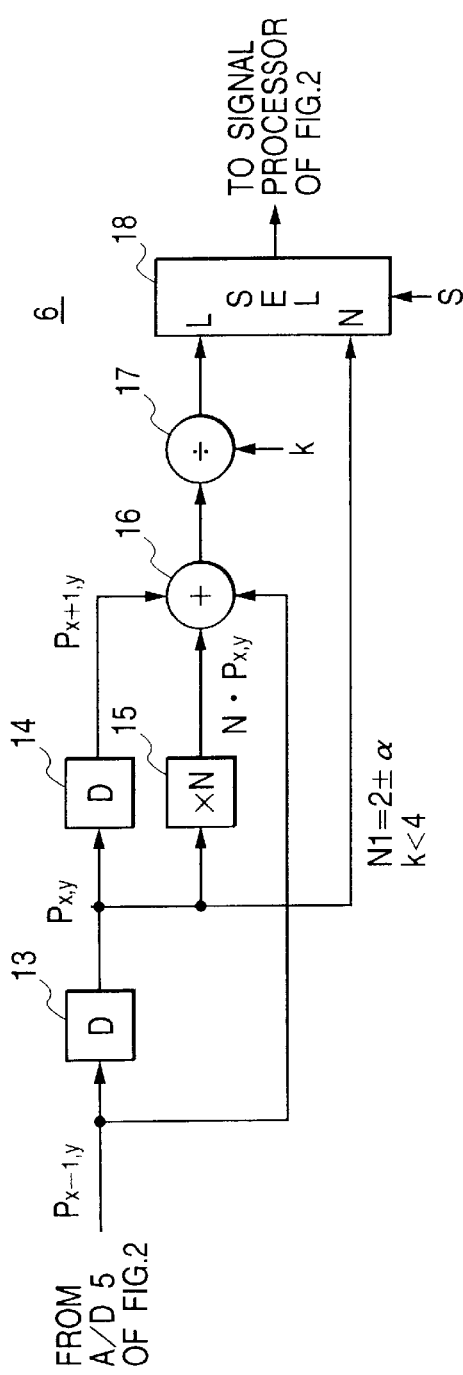
FIG. 3 is a block diagram showing an exemplary arrangement of a first illustrative embodiment of the signal synthesizer 6 of FIG. 2.

FIG. 3 is a block diagram showing an exemplary arrangement of a first illustrative embodiment of the signal synthesizer 6 of FIG. 2. In FIG. 2 the signal synthesizer 6 comprises two serially connected 1P-delay elements (D) 13 and 14 for delaying an input signal for a pixel's worth of time period, an N-times multiplier 15 having its input connected to the connection node between the two 1P-delay elements 13 and 14, an adder 16 having its three inputs connected to the two ends of the two serially connected 1P-delay elements 13 and 14 and the multiplier 15 output, a (1/k)-divider having its input connected to the adder 16 output, and a 1-out-of-2 selector 18 having its two inputs (L and N) connected to the (1/k)-divider 17 output and the connection node among the two delay elements 13 and 14 and the N-times multiplier 15 and having its control input connected to a controller 12 output (S).

In operation, incident light to the lens 1 is converged on the CCD 2, which in turn provides, as an output image signal, a series of the pixel values for a taken picture. The image signal is processed in a well-known manner by CDS 3, ALC 10 and AGC 4. A signal from the AGC is converted by the A/D converter 5 into a digital pixel data sequence.

For the sake of better understanding the following description, the digital pixel data sequence for a picture of image is expressed by using (x,y) coordinates as:

$$\{P_{x,y} | x=1, 2, \ldots A, \text{ and } y=1, 2, \ldots B\} \quad (1)$$

where A is the number of pixels in a line and B is the number of pixels in a column.

On the other hand, the low illuminance detector 11 monitors the output signal from the CDS 3. On detecting that the CDS 3 output signal is smaller than a predetermined value, the low illuminance detector 11 asserts a signal to the controller 12. In response to the assertion from the detector 11, the controller 12 in turn asserts a control signal S to the signal synthesizer 6.

Here, it is assumed that the 1-out-of-2 selector 18 selects, as an output signal, a signal input to its N input terminal usually or normally (i.e., if the CDS 3 output signal is not smaller than the predetermined value). Also, it is assumed that the signals at the three terminals of the two serially connected delay elements (D) 13 and 14 are expressed as $P_{x-1,y}$, $P_{x,y}$ and $P_{x+1,y}$ if the current pixel is located by (x,y). For this reason, the selector 18 outputs a signal $P_{x,y}$ as it is if the CDS 3 output signal is not smaller than the predetermined value.

Since the delay element 13 output $P_{x,y}$ is multiplied by N at the N-times multiplier 16, the adder 16 outputs a sum of $P_{x-1,y}$, $N \cdot P_{x,y}$ and $P_{x+1,y}$. Then, the (1/k)-divider 17 divides the sum by a constant k stored in a memory (not shown) to supply:

$$(P_{x-1,y} + N \cdot P_{x,y} + P_{x+1,y})/k \quad (2)$$

to the L input terminal of the selector 18.

If the signal S is asserted by the controller 12, then the selector 18 responsively changes its output from the original pixel signal $P_{x,y}$ to an averaged or filtered pixel signal given by the expression (2).

In the expression (2), the multiplication factor N and the division factor k are so set that the gain at the L input terminal is larger than 1. The multiplication factor N is preferably set to about 2. That is, $N=2\pm\alpha$ ($\alpha$: a suitable small numeral).

If N=2, then the signal synthesizer 6 of FIG. 3 functions as a low pass filter that provides a weighted moving average of three adjacent pixels at the ratio 1:2:1. Accordingly, an increase in gain and a noise reduction can be achieved at the same time by setting the division factor k smaller than 4.

Figure 1:
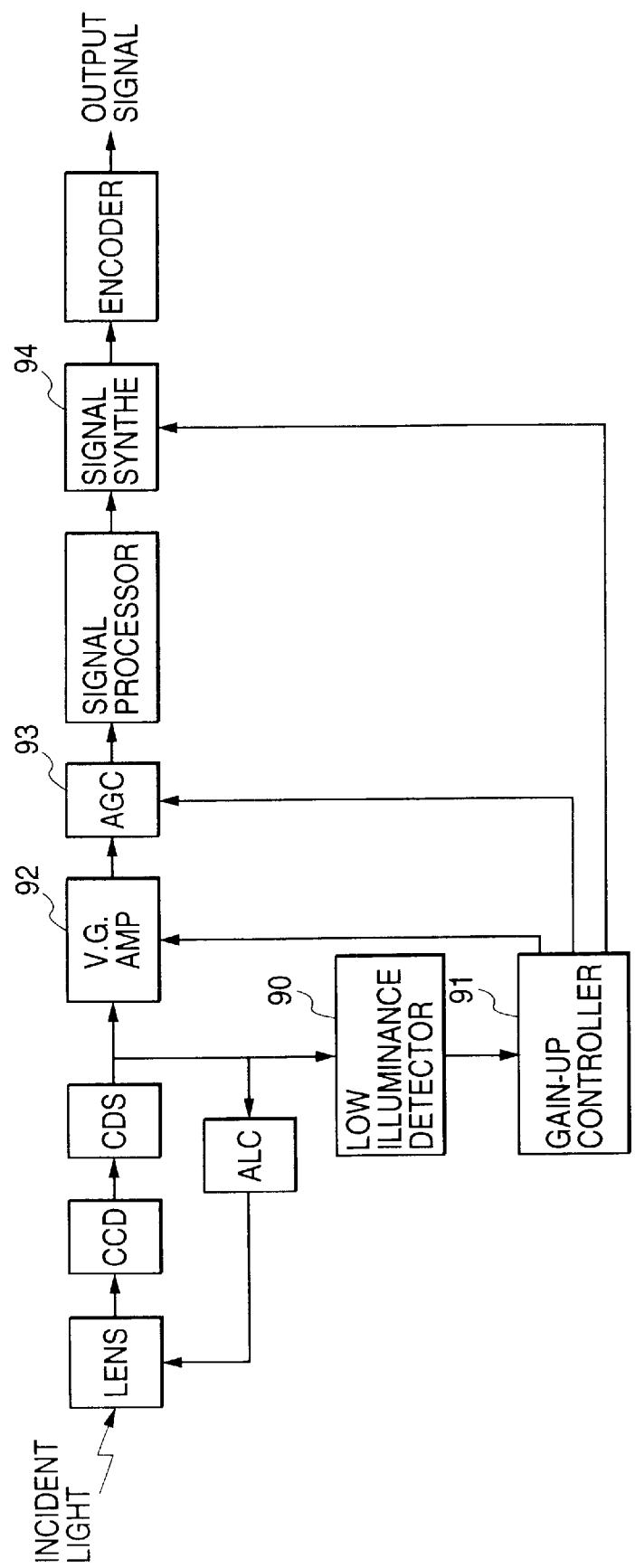
FIG. 1 is a block diagram showing an arrangement of a prior art image pickup device.
Figure 4:
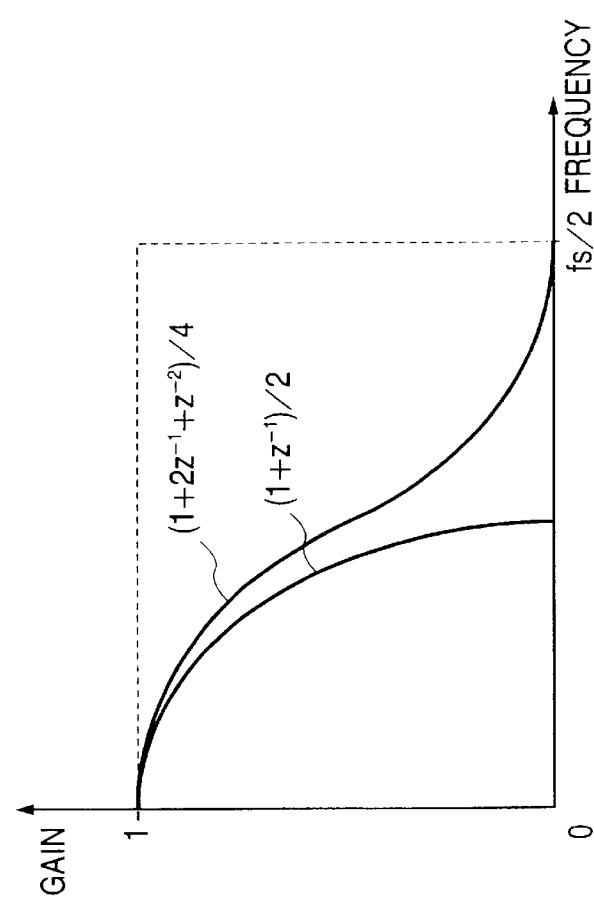
FIG. 4 is a graph showing a frequency-gain characteristic curve of the signal synthesizer 6 of FIGS. 3 and 5, and that of the prior art signal synthesizer 94 of FIG. 1.

FIG. 4 is a graph showing a frequency-gain characteristic curve (G1) of the signal synthesizer 6 shown in FIG. 3 and that (G2) of the prior art signal synthesizer 94 of FIG. 1. In FIG. 4, the abscissa indicates the frequency. The frequency fs indicates the sampling frequency. The ordinate indicates the gain at the L terminal. The transfer function of the signal synthesizer 6 that synthesizes three adjacent pixels at the rate 1:2:1 is given by $(1+2\cdot z^{-1}+z^{-2})/4$. The transfer function of the prior art signal synthesizer 94 of FIG. 1 that synthesizes two adjacent pixels is by $(1+z^{-1})/2$. As seen from FIG. 4, the curve G1 of the inventive signal synthesizer 6 stretches to a higher band as compared with the curve G2 of the synthesizer 94. This mitigates the deterioration of the horizontal resolution.

Thereafter, thus obtained image signal is digitally processed by the signal processor 7, D/A-converted by the D/A converter 8 and encoded by encoder 9 in a well-known manner.

As described above, an embodiment of the invention that uses the signal synthesizer 6 of FIG.3 enables a gain increase and noise reduction at the same time while mitigating the deterioration of horizontal resolution by summing three adjacent pixels at the rate 1:2:1 and dividing the result by a numeral smaller than 4 so as to make the gain larger than 1 when a low illuminance is detected.

Figure 5:
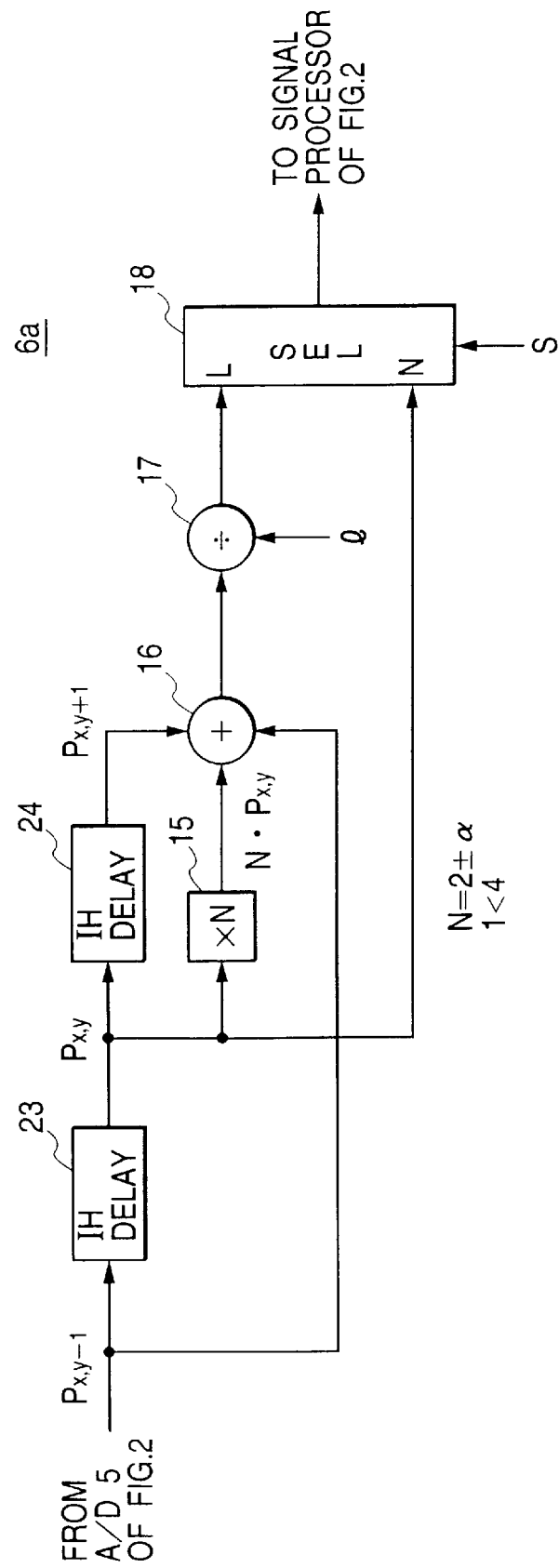
FIG. 5 is a block diagram showing an exemplary arrangement of a second illustrative embodiment of the signal synthesizer 6 of FIG. 2.

FIG. 5 is a block diagram showing an exemplary arrangement of a second illustrative embodiment of the signal synthesizer 6 of FIG. 2. The signal synthesizer 6a of FIG. 5 is identical to that of FIG. 3 except that the 1P-delay elements 13 and 14 have been replaced by 1H-delay elements 23 and 24 for delaying an input signal for one horizontal line's worth of time period. Therefore, the descriptions concerning FIG. 3 become true by reading "horizontal" as "vertical". It is noted that the 1H-delay elements 23 and 24 are preferably realized by using 1H memories as is well known in the art.

Figure 6:
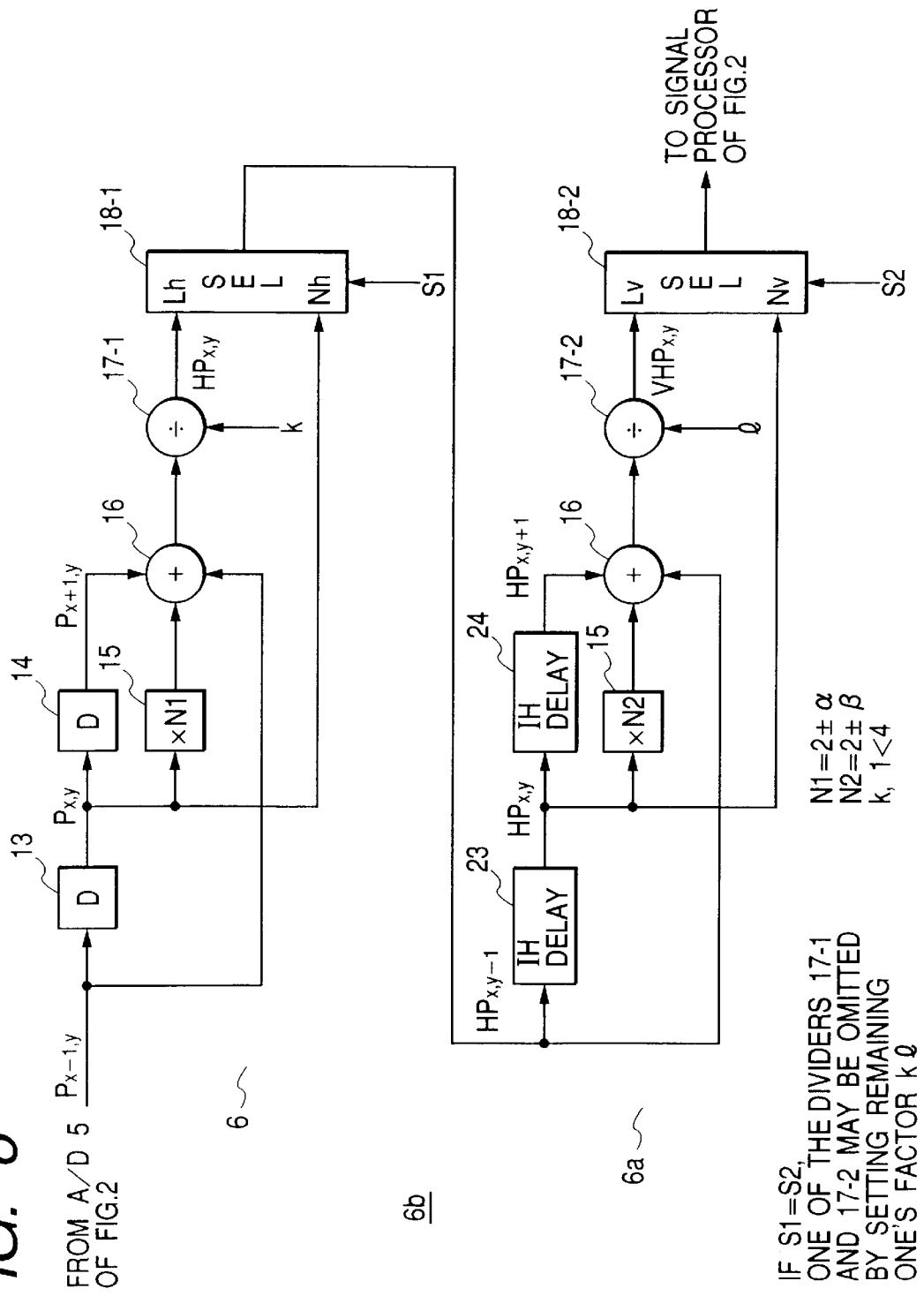
FIG. 6 is a block diagram showing an exemplary arrangement of a third illustrative embodiment of the signal synthesizer 6 of FIG. 2.

FIG. 6 is a block diagram showing an exemplary arrangement of a third illustrative embodiment of the signal synthesizer 6 of FIG. 2. The signal synthesizer 6b of FIG. 6 is a simple concatenation of the two synthesizers 6 and 6a of FIGS. 3 and 5. In the case, the controller 12 preferably provides a common control signal S to both of the selectors 18-1 and 18-2. However, the controller 12 may provide only one control signal S1 or S2 with the other control signal S2 or S1 fixed to a nonassertion state.

In order to analyze the operation of the signal synthesizer 6b of FIG. 6, the signal at the Lh input terminal of the first selector 18-1 is expressed as "$HP_{x,y}$", and the signal at the Lv input terminal of the second selector 18-2 is expressed as "$VHP_{x,y}$". Then, from expression (2), we obtain:

$$HP_{x,y} = (P_{x-1,y} + N1 \cdot P_{x,y} + P_{x+1,y})/k. \quad (3)$$

Using equation (3), the signal $VHP_{x,y}$ is calculated as follows:

$$VHP_{x,y} = (HP_{x,y-1} + N2 \cdot HP_{x,y} + HP_{x,y+1})/\ell \quad (4)$$

-continued $$= \{(P_{x-1,y-1} + N1 \cdot P_{x,y-1} + P_{x+1,y-1})/k +$$

$$N2 \cdot (P_{x-1,y} + N1 \cdot P_{x,y} + P_{x+1,y})/k +$$

$$(P_{x-1,y+1} + N1 \cdot P_{x,y+1} + P_{x+1,y+1})/k\}/\ell$$

$$= \frac{1}{k\ell} \cdot \{N1 \cdot N2 \cdot P_{x,y} + N1 \cdot (P_{x,y-1} + P_{x,y+1}) +$$

$$N2 \cdot (P_{x-1,y} + P_{x+1,y}) + (P_{x-1,y-1} +$$

$$P_{x+1,y-1} + P_{x-1,y+1} + P_{x+1,Y+1})\}.$$

If the multiplication factors N1 and N2 are set to 2 and the division factors k and l are set to 4 (i.e., kl=16), then equation (4) becomes:

$$VHP_{x,y} = \frac{1}{16} \cdot \{4P_{x,y} + 2(P_{x,y-1} + P_{x,y+1} + P_{x-1,y} + P_{x+1,y}) + \quad (5)$$

$$(P_{x-1,y-1} + P_{x+1,y-1} + P_{x-1,y+1} + P_{x+1,Y+1})\}.$$

FIG. 7 is a diagram illustrating how the relevant pixels are weighted. In FIG. 7, the current pixel Px,y is denoted by a black circle "●". The pixels horizontally and vertically adjacent to the current pixel—i.e., Px−1,y, Px+1,y, Px,y−1 and Px,y+1—are denoted by double circles "◎". The pixels obliquely adjacent to the current pixel—i.e., Px−1,y−1, Px+1,y−1, Px−1,y+1and Px+1,y+1—are denoted by symbols "⊕".

As seen from equation (5) and FIG. 7, if the low illuminance is detected, the signal synthesizer 6b of FIG. 6 provides a weighted moving average of the current pixel Px,y, the horizontally and vertically adjacent pixels Px−1,y, Px+1,y, Px,y−1 and Px,y+1 and the obliquely adjacent pixels Px−1,y−1, Px+1,y−1, Px−1,y+1 and Px+1,y+1 at the weighting ratio 4:2:1 (=●:◎:⊕), respectively if the values N1 and N1 equal to 2.

Accordingly, by setting the division factors k and l smaller than 4, an increase in gain and a noise reduction can be achieved at the same time while mitigating the deterioration of resolution.

Though the two synthesizers 6 and 6a are concatenated in this order in FIG. 6, reversing the concatenation order brings the same result as seen from equation (4).

Figure 8:
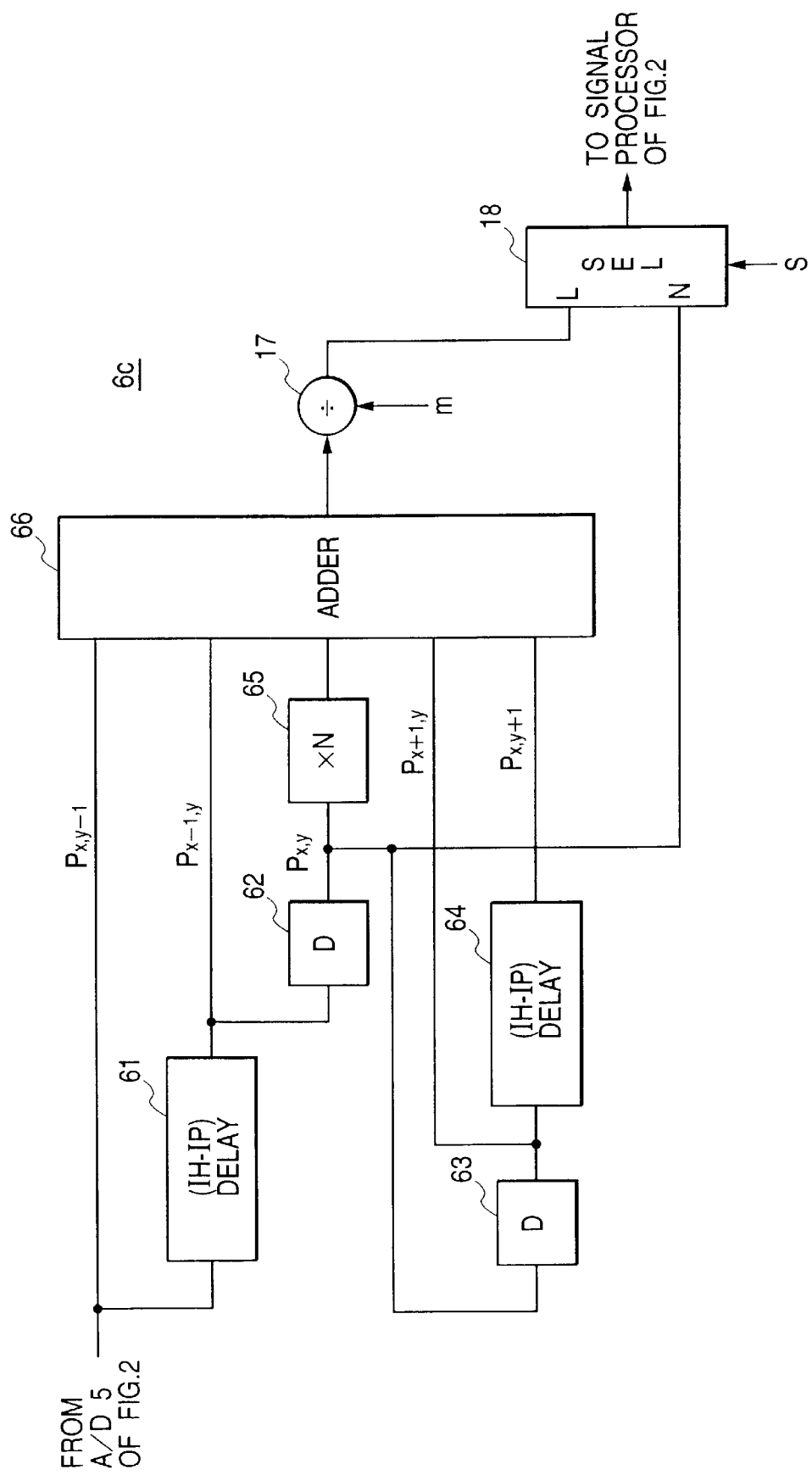
FIG. 8 a block diagram showing an exemplary arrangement of a fourth illustrative embodiment of the signal synthesizer 6 of FIG. 2.

FIG. 8 is a block diagram showing an exemplary arrangement of a fourth illustrative embodiment of the signal synthesizer 6 of FIG. 2. In FIG. 8, the signal synthesizer 6c comprises a (1H-1P)-delay element 61 the input of which serves as the input terminal of this synthesizer 6c, two 1P-delay elements 62 and 63 and a (1H-1P)-delay element 64, which are serially connected in the stated order. The signal synthesizer 6c further comprises a N-times multiplier 65 having its input connected to the two delay elements' connection node, an adder 66 having its 5 input terminals connected to the N-times multiplier 65 output and the terminals of the (1H-1P)-delay elements 61 and 64, a divider 17 for dividing the adder 66 output by a constant m, and a selector 18 having its L input connected to the divider 17 output and having its N input connected to the 1P-delay element 62 output. The (1H-1P)-delay elements 61 and 64 are preferably memories for storing one line's worth of pixel values minus one pixel value.

Assuming that the 1P-delay element 62 output is Px,y, then the signal at the L input of the selector 18 is given by:

$$(1/m) \cdot (Px,y-1+Px-1,y+N \cdot Px,y+Px+1,y+Px,y+1). \quad (6)$$

If it is assumed that the weight of the current pixel Px,y balances with the total weight of the other relevant pixels, then the multiplication factor N is 4. In order to make the overall gain of the signal synthesizer 6c larger than 1, the division factor m has to satisfy that m <8.

FIG. 9 is a diagram illustrating how the relevant pixels are weighted in the signal synthesizer of FIG. 8. In FIG. 8, the current pixel Px,y is denoted by a black circle "●". The pixels horizontally and vertically adjacent to the current pixel—i.e., Px−1,y, Px+1,y, Px,y−1 and Px,y+1—are denoted by double circles "◎".

As seen from expression (6) and FIG. 9, if the low illuminance is detected, the signal synthesizer 6c of FIG. 8 provides a weighted moving average of the current pixel Px,y and the horizontally and vertically adjacent pixels Px−1,y, Px+1,y, Px,y−1 and Px,y+1 at the weighting ratio N:1 (=●:◎)(e.g., 4:1 for N=4).

Accordingly, by setting the division factor m smaller than 8, an increase in gain and a noise reduction can be achieved at the same time while mitigating the deterioration of resolution.

It is noted that the delay elements 13, 14, 62 and 63 may be replaced with 1P-memories for storing one pixel's worth of data.

In the above-described embodiments, the low illuminance detector 11 has used only one predetermined value for judging a low illuminance. However, the low illuminance detector 11 may be so arranged as to detect a plurality of lower illuminance levels by using a few reference values. Responsively, the controller 12 changes the value of the division factors k, l or m according to the reference values used for judging.

Many widely different embodiments of the present invention may be constructed without departing from the spirit and scope of the present invention. It should be understood that the present invention is not limited to the specific embodiments described in the specification, except as defined in the appended claims.

What is claimed is:

1. An imaging apparatus including;
   means for converting an image signal having been imaged and amplified into a series of digital pixel values;
   means for finding a weighted moving average of a current pixel value and pixel values of at least two pixels spatially adjacent to the pixel of said current pixel value;
   means for dividing said weighted moving average by a division factor smaller than the sum of weights used in said finding a weighted moving average;
   means, operative in the event said image signal is smaller than a predetermined value, for providing a next stage with an output signal from said means for dividing said weighted moving average as said current pixel value.

2. An imaging apparatus as defined in claim 1, wherein said means for finding a weighted moving average comprises means for finding a weighted moving average of said current pixel value and pixel values of two pixels horizontally adjacent to the pixel of said current pixel value.

3. An imaging apparatus as defined in claim 1, wherein said means for finding a weighted moving average comprises means for finding a weighted moving average of said current pixel value and pixel values of two pixels vertically adjacent to the pixel of said current pixel value.

4. An imaging apparatus as defined in claim 2, wherein said means for finding a weighted moving average comprises means for finding a sum of twice said current pixel value and said pixel values.

5. An imaging apparatus as defined in claim 3, wherein said means for finding a weighted moving average comprises means for finding a sum of twice said current pixel value and said pixel values.

6. An imaging apparatus as defined in claim 1, wherein said means for finding a weighted moving average comprises means for finding a weighted moving average of said current pixel value and pixel values of four pixels horizontally and vertically adjacent to the pixel of said current pixel value.

7. An imaging apparatus as defined in claim 6, wherein said means for finding a weighted moving average comprises means for finding a sum of four times said current pixel value and said pixel values.

8. An imaging apparatus as defined in claim 1, wherein said means for finding a weighted moving average comprises first means for finding a first weighted moving average of said current pixel value and pixel values of two pixels horizontally or vertically adjacent to the pixel of said current pixel value, and wherein imaging apparatus further includes:

means, serially connected after said means for providing an output signal, for finding a second weighted moving average of a current pixel value and pixel values of two pixels linearly adjacent to the pixel of said current pixel value, the direction of the adjacent pixels being perpendicular to the adjacent pixels used in said first means;

means for dividing said second weighted moving average by a division factor smaller than the sum of weights used in said finding a weighted moving average;

means, operative in the event said image signal is smaller than a predetermined value, for providing, as an output thereof, an output signal from said means for dividing said second weighted moving average.

9. An imaging apparatus as defined in claim 8, wherein said first means for finding a first weighted moving average finds a sum of twice said current pixel value and said pixel values of two pixels horizontally or vertically adjacent, and wherein said means for finding a second weighted moving average find a sum of said current pixel value and said pixel values of two pixels linearly adjacent to the pixel of said current pixel value.

\* \* \* \* \*